US 9,092,274 B2

(12) United States Patent
Cardona et al.

(10) Patent No.: US 9,092,274 B2
(45) Date of Patent: Jul. 28, 2015

(54) ACCELERATION FOR VIRTUAL BRIDGED HOSTS

(75) Inventors: Omar Cardona, Cedar Park, TX (US); Vinit Jain, Austin, TX (US); Renato J. Recio, Austin, TX (US); Rakesh Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 13/313,534

(22) Filed: Dec. 7, 2011

(65) Prior Publication Data
US 2013/0152075 A1    Jun. 13, 2013

(51) Int. Cl.
G06F 15/16      (2006.01)
G06F 9/54       (2006.01)
G06F 9/455      (2006.01)

(52) U.S. Cl.
CPC .............. *G06F 9/54* (2013.01); *G06F 9/45558* (2013.01); *G06F 2009/45595* (2013.01)

(58) Field of Classification Search
CPC .......................... H04L 12/4641; G06F 9/4558
See application file for complete search history.

(56) References Cited

U.S. PATENT DOCUMENTS

| | | | |
|---|---|---|---|
| 2004/0128398 A1* | 7/2004 | Pettey ............................ | 709/249 |
| 2008/0089338 A1* | 4/2008 | Campbell et al. ............. | 370/392 |
| 2010/0082874 A1 | 4/2010 | Baba et al. .................... | 710/316 |
| 2010/0257263 A1 | 10/2010 | Casado et al. ................ | 709/223 |
| 2011/0154318 A1* | 6/2011 | Oshins et al. .................. | 718/1 |
| 2011/0191518 A1 | 8/2011 | Srinivasan .................... | 710/311 |
| 2012/0324442 A1* | 12/2012 | Barde ............................. | 718/1 |
| 2013/0019014 A1* | 1/2013 | Johnsen et al. ............... | 709/225 |

OTHER PUBLICATIONS

"Virtual Machine Networking: Standards and Solutions," Cisco, 2011 (downloaded Oct. 3, 2011 from http://www.cisco.com/en/US/prod/collateral/switches/ps9441/ps9902/whitepaper_c11-620065_ps10277_Products_White_Paper.html), 10 pages.
"Server-to-Network Edge Technologies: Converged Networks and Virtual I/O," Hewlett-Packard Development Company, Mar. 2010, 25 pages.

* cited by examiner

*Primary Examiner* — Djenane Bayard
(74) *Attorney, Agent, or Firm* — Van Leeuwen & Van Leeuwen; Thomas E. Tyson

(57) ABSTRACT

An approach is provided in which a hardware accelerated bridge executing on a network adapter receives an ingress data packet. The data packet includes a destination MAC address that corresponds to a virtual machine, which interfaces to a software bridge executing on a hypervisor. The hardware accelerated bridge identifies a software bridge table entry that includes the destination MAC address and a virtual function identifier, which identifies a virtual function corresponding to the software bridge. In turn, the hardware accelerated bridge sends the data packet from the hardware accelerated bridge to the software bridge through the identified virtual function.

25 Claims, 9 Drawing Sheets

ACCELERATION FOR VIRTUAL BRIDGED HOSTS

BACKGROUND

The present disclosure relates to utilizing a hardware accelerated bridge to accelerate processing of ingress data packets that are destined to software bridged virtual machines.

Hardware and software vendors offer virtualization platforms that allow a single physical machine to be partitioned into multiple independent virtual machines. These virtualization platforms have become accepted in the industry market on a small business level and on an enterprise level. Virtualization technology continues to develop in several directions in order to meet the demands of modern IT applications, such as in network services for multi-tenant environments.

A Virtual Ethernet Bridge (VEB) may be implemented within a virtualized server environment to support communication between virtual machines, a hypervisor, and external network switches. VEBs may be software-based virtual switches, or "vSwitches," that may execute within a hypervisor, or hardware-based virtual switches executing on a network interface card that, for example, implement a PCI Single Root I/O Virtualization (SR-IOV) standard.

BRIEF SUMMARY

According to one embodiment of the present disclosure, an approach is provided in which a hardware accelerated bridge executing on a network adapter receives an ingress data packet. The data packet includes a destination MAC address that corresponds to a virtual machine, which interfaces to a software bridge executing on a hypervisor. The hardware accelerated bridge identifies a software bridge table entry that includes the destination MAC address and a virtual function identifier, which identifies a virtual function corresponding to the software bridge. In turn, the hardware accelerated bridge sends the data packet from the hardware accelerated bridge to the software bridge through the identified virtual function.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
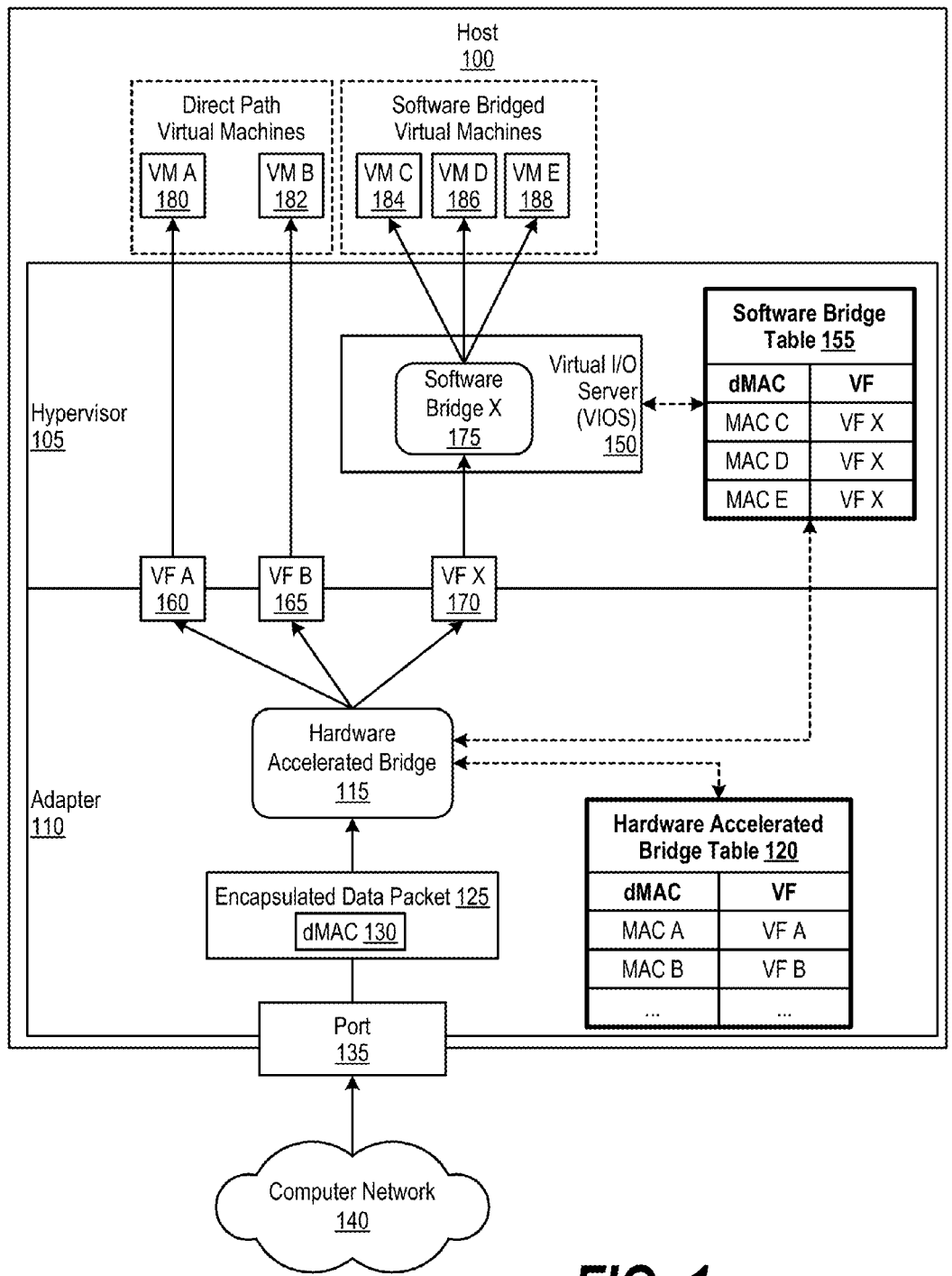
FIG. 1 is a diagram showing a hardware accelerated bridge accessing a software bridge table in order to forward an ingress data packet to a corresponding software bridged virtual machine.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

A hardware accelerated bridge accesses a software bridge table to identify a virtual machine that interfaces to a software bridge. In turn, the hardware accelerated bridge utilizes its hardware acceleration capability to process ingress data packets destined for the virtual machine that traverse through a computer network. In one embodiment, the data packets traverse through one or more virtual domains based upon a distributed overlay network environment.

FIG. 1 is a diagram showing a hardware accelerated bridge accessing a software bridge table in order to forward an ingress data packet to a corresponding software bridged virtual machine.

Host 100 executes hypervisor 105 and includes network adapter 110. Network adapter 110 (e.g., a network interface card) executes hardware accelerated bridge 115 that utilizes network adapter 110*s*'s hardware-based functionality to send and receive data to and from host 100, thus accelerating egress and ingress data packets. In one embodiment, hardware accelerated bridge 115 may implement a PCI Single Root I/O Virtualization (SR-IOV) standard.

For each virtual machine that hypervisor 105 assigns directly to hardware accelerated bridge 115, network adapter 110 instantiates a corresponding "direct path" virtual function that acts as a conduit to send and receive data between a virtual machine and hardware accelerated bridge 115. The example shown in FIG. 1 includes two "direct path" virtual machines, which are virtual machine A 180 and virtual machine B 182, which interface to direct path virtual machines 160 and 165, respectively.

In one embodiment, direct path virtual functions 160 and 165 are assigned a MAC address that matches their respective direct path virtual machines 180 and 182. As such, when hardware accelerated bridge 115 receives encapsulated data packet 125 from computer network 140 through port 135, hardware accelerated bridge 115 selects a hardware accelerated bridge table entry in hardware accelerated bridge table 120 that includes a corresponding destination MAC address (dMAC 130). In turn, hardware accelerated bridge 115 extracts a virtual function identifier from the selected table entry that identifies the appropriate virtual function to which to send encapsulated data packet 125. In some embodiments, dMAC 130 corresponds to a software bridged virtual machine and does not have a corresponding table entry in hardware accelerated bridge table 120 (discussed below).

Virtual I/O server (VIOS) 150, which includes software bridge X 175, is a special privileged virtual machine that serves as a Virtual I/O server to bridge virtual networks to physical networks. In one embodiment, VIOS 150 is software that is located in one of hypervisor 105's logical partitions and facilitates sharing of physical I/O resources between virtual machines assigned to software bridge X 175 (e.g., software bridged virtual machines 184-188). In this embodiment, VIOS 150 may provide virtual SCSI target, virtual fibre channel, shared Ethernet Adapter, and PowerVMT™ Active Memory Sharing capability to the software bridged virtual machines within host 100.

Sharing physical resources results in a single "software bridge" virtual function assigned to each software bridge (e.g., virtual function X 170 is assigned to software bridge 175). As such, hardware accelerated bridge table 120 may not include MAC addresses that correspond to software bridged virtual machines 184-188. In order to take advantage of accelerated throughput processing provided by hardware accelerated bridge 115, VIOS 150 populates software bridge table 155 with table entries that link virtual machine MAC addresses with software bridge X 175's corresponding virtual function (see FIG. 3 and corresponding text for further details). As such, hardware accelerated bridge 115 accesses software bridge table 155 when dMAC 130 does not match a table entry in hardware accelerated bridge 120 to determine whether dMAC 130 corresponds to one of software bridged virtual machines 184-188. If so, hardware accelerated bridge 115 sends a decapsulated data packet to virtual function X 170 for subsequent processing by software bridge X 175, which forwards the decapsulated data packet onto one of software bridged virtual machines 184-188.

Figure 2:
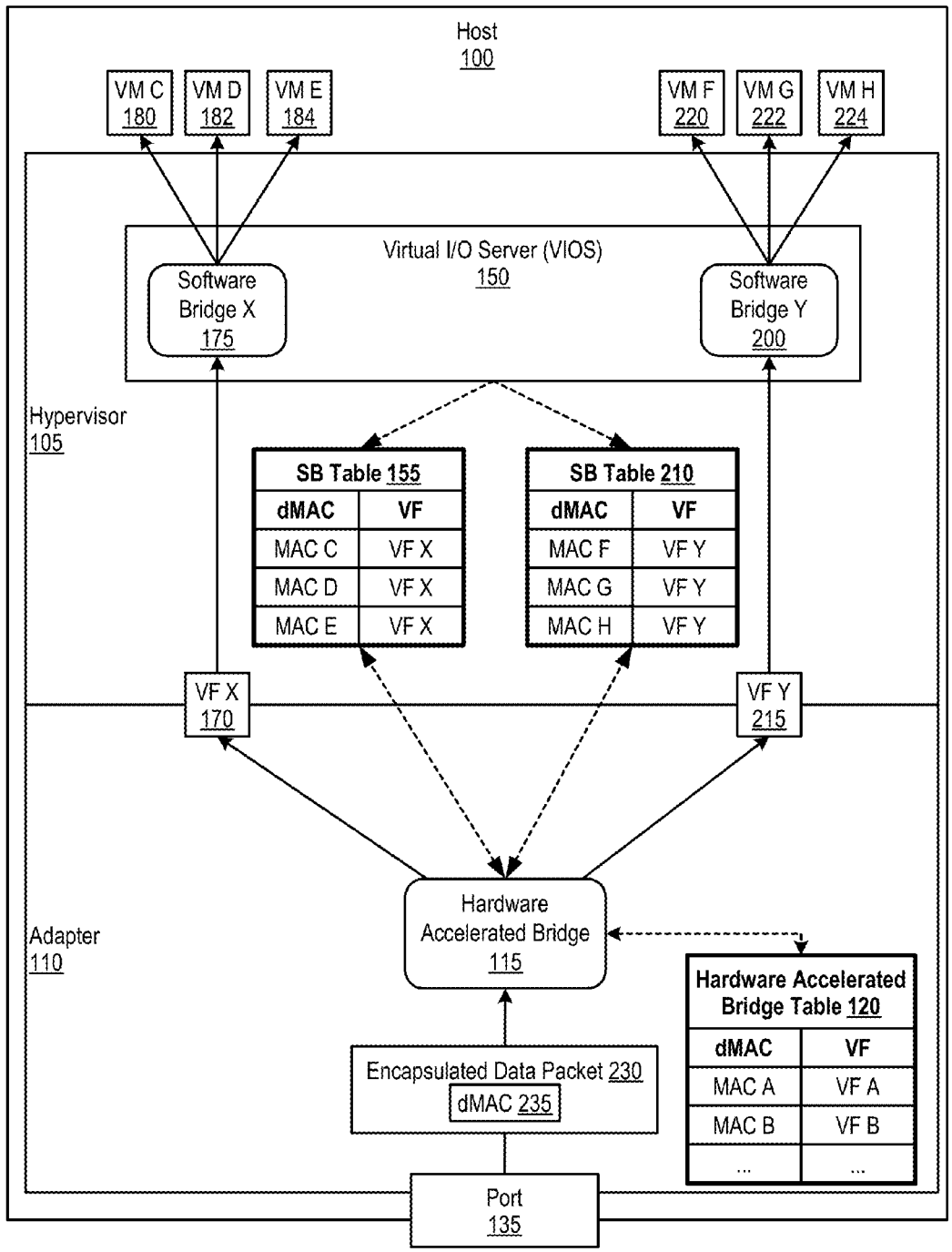
FIG. 2 is a diagram showing a hardware accelerated bridge forwarding an ingress data packet to one of multiple software bridges executing on a hypervisor.

FIG. 2 is a diagram showing a hardware accelerated bridge forwarding an ingress data packet to one of multiple software bridges executing on a hypervisor. FIG. 2 is similar to FIG. 1 with the exception that FIG. 2 shows VIOS 150 executing two different software bridges 175 and 200. In one embodiment, the different software bridges may support different tenants. In another embodiment, VIOS 150 manages two separate software bridge tables 155 and 210 to support the two different software bridges.

When hardware accelerated bridge 115 received encapsulated data packet 230, hardware accelerated bridge 115 first accesses hardware accelerated bridge table 120 to check for a hardware accelerated bridge table entry. If no table entry is found, hardware accelerated bridge checks software tables 155 and 210 for a corresponding software bridge table entry. When hardware accelerated bridge 115 identifies a corresponding table entry in software table 155, hardware accelerated bridge 115 determines, from the identified table entry, to forward the data packet to virtual function 170, which passes the data packet to software bridge X 175 for further traversal to virtual machines 180, 182, or 184.

Likewise, when hardware accelerated bridge 115 identifies a corresponding table entry in software table 210, hardware accelerated bridge 115 determines, from the identified table entry, to forward the data packet to virtual function 215, which passes the data packet to software bridge Y 200 for further traversal to virtual machines 220, 222, or 224.

Figure 3:
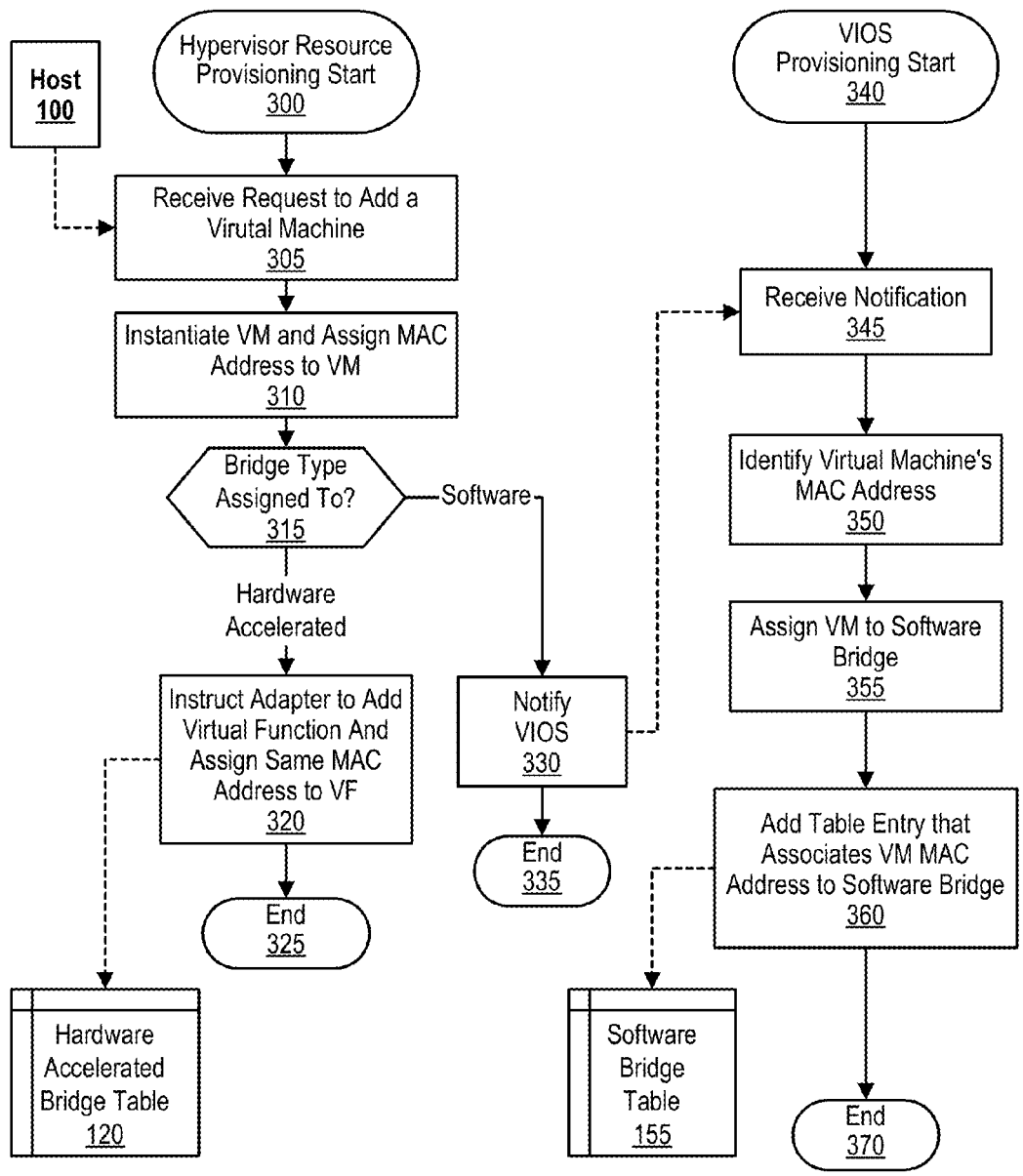
FIG. 3 is a flowchart showing steps taken is a hypervisor instantiating a new virtual machine, and a virtual function assigned to the virtual machine by either the hypervisor or a VIOS.

FIG. 3 is a flowchart showing steps taken is a hypervisor instantiating a new virtual machine, and a virtual function assigned to the virtual machine by either the hypervisor or a VIOS. Hypervisor processing commences at 300, whereupon the hypervisor receives a request from host 100 to add a virtual machine at step 305. At step 310, the hypervisor instantiates a new virtual machine and assigns a MAC address to the virtual machine. In one embodiment, the hypervisor selects the MAC address from a range of MAC addresses available to the hypervisor.

The hypervisor determines whether the virtual machine is assigned to a software bridge (e.g., executing on the hypervisor) or a hardware accelerated bridge that executes on a network adapter (decision 315). If the virtual machine is assigned to the hardware accelerated bridge, decision 315 branches to the "Hardware Accelerated" branch, whereupon the hypervisor instructs the hardware accelerated bridge to instantiate a virtual function (direct path virtual function) on the network adapter and assign a MAC address to the virtual function that matches the virtual machine's MAC address. In turn, the hardware accelerated bridge adds a hardware accelerated bridge table entry to hardware accelerated bridge table 120 that includes the virtual machine's MAC address and a virtual function identifier that identifies the corresponding virtual function (step 320). Processing ends at 325.

On the other hand, of the virtual machine is assigned to a software bridge, decision 315 branches to the "Software" branch, whereupon the hypervisor notifies the VIOS at step 330 and ends processing at 335.

VIOS processing commences at 340, whereupon the VIOS receives the hypervisor's notification at step 345. At step 350, the VIOS identifies the virtual machine's MAC address that the hypervisor assigned and, at step 355, the VIOS assigns the virtual machine to a software bridge, such as a software virtual Ethernet bridge. As such, the virtual machine assigned to a software bridge is referred to herein as a "software bridged virtual machine." In one embodiment, the VIOS selects a software bridge from multiple software bridges to assign the virtual machine (see FIG. 2 and corresponding text for further details).

At step 360, the VIOS adds a software bridge table entry to software bridge table 155 that links the virtual machine MAC address to the software bridge's corresponding virtual function (see FIGS. 1-2 and corresponding text for further details). In turn, the hardware accelerated bridge is able to access software bridge table 155 to forward ingress data packets destined for the newly instantiated virtual machine to the appropriate virtual function, which forwards the data packet to the software bridge and onto the virtual machine (see FIG. 5 and corresponding text for further details). Processing ends at 370.

Figure 4:
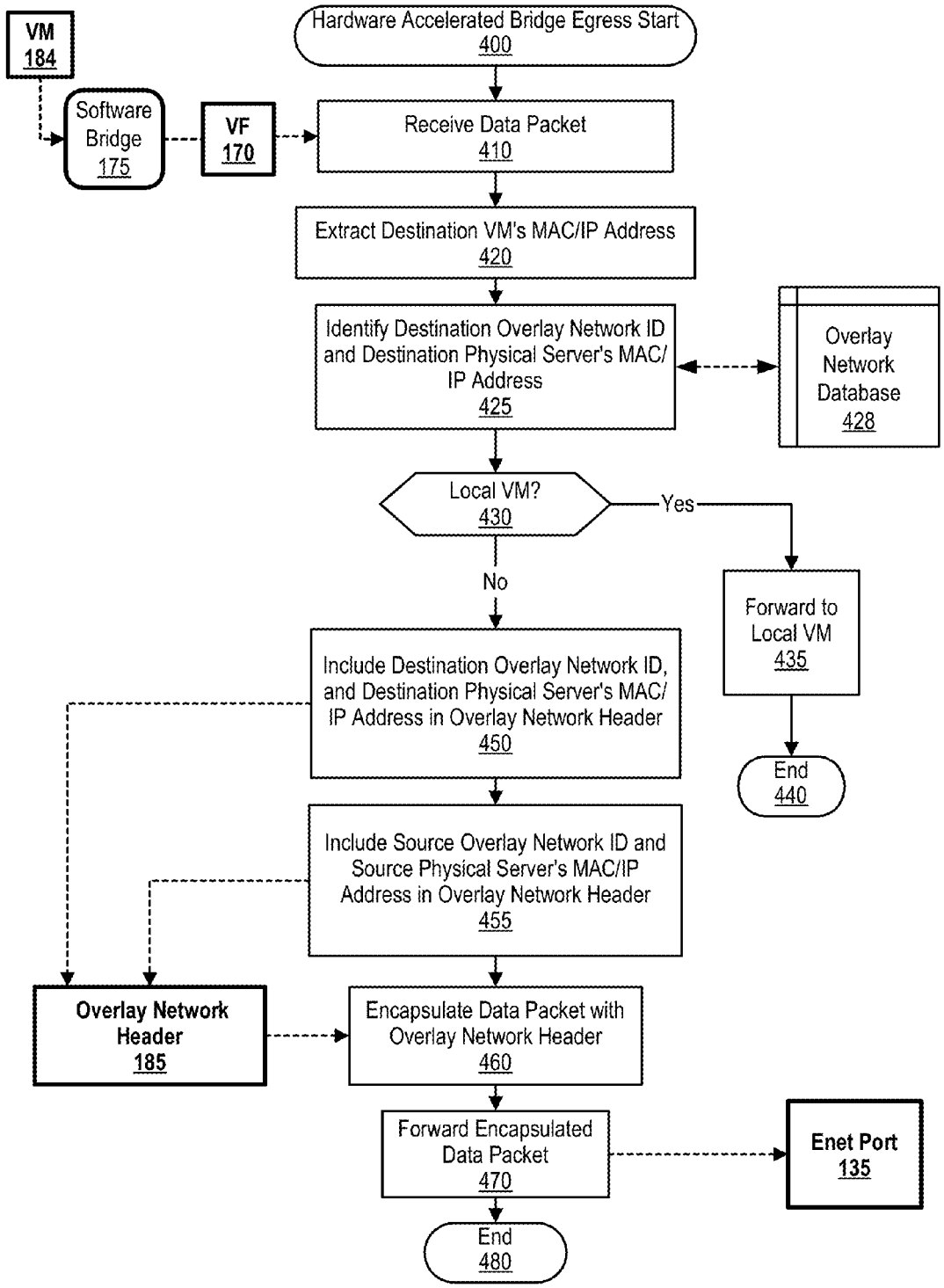
FIG. 4 is a flowchart showing steps taken in receiving and processing an egress data packet at a hardware accelerated bridge.

FIG. 4 is a flowchart showing steps taken in receiving and processing an egress data packet at a hardware accelerated bridge. The embodiment shown in FIG. 4 pertains to sending egress data packets over a distributed overlay network environment that includes one or more virtual domains. In this embodiment, each of the virtual domains may correspond to different tenants and are independent of physical constraints of an underlying physical network (see FIG. 7 and corresponding text for further details).

Processing commence at 400, whereupon the hardware accelerated bridge receives a data packet from virtual machine 184 through software bridge 175 and virtual function 170 at step 410. At step 420, the hardware accelerated bridge extracts a MAC/IP address from the data packet that corresponds to a destination virtual machine.

Next, at step 425, the hardware accelerated bridge accesses overlay network database 428, and identifies a destination overlay network identifier and a physical host address that corresponds to the destination virtual machine's IP address. The destination overlay network identifier indicates a virtual network corresponding to the destination virtual machine (e.g., virtual network "4") and the physical host address is the MAC and IP address of the server that executes the destination virtual machine.

A determination is made as to whether the destination virtual machine is managed by the same hardware accelerated bridge (e.g., a "local" virtual machine, decision 430). If so, the hardware accelerated bridge is not required to encapsulate the data packet, and decision 430 branches to the "Yes" branch whereupon, at step 435, the hardware accelerated bridge forwards the data packet to the destination virtual machine through the identified virtual function. In one embodiment, the hardware accelerated bridge accesses hardware accelerated bridge table or a software bridge table to identify the correct virtual function (see FIG. 5 and corresponding text for further details). Processing ends at 440.

On the other hand, if the destination virtual machine is not a local virtual machine, decision 430 branches to the "No" branch, whereupon the hardware accelerated bridge includes the destination overlay network identifier, the destination physical server's MAC/IP address in overlay network header 452 (step 450). Next, the hardware accelerated bridge includes information pertaining to source virtual machine 184 into overlay network header 452, such as the source overlay network identifier and the source's physical server's MAC/IP address (step 455). As those skilled in the art can appreciate, steps 450 and 455 may be performed at the same time or separated into steps different than that shown in FIG. 4.

In turn, the hardware accelerated bridge encapsulates the data packet with overlay network header 452 (step 460). At step 470, the hardware accelerated bridge sends the encapsulated data packet to the destination virtual machine through Ethernet port 135 over a distributed overlay network environment. In one embodiment, the encapsulated data packet traverses over multiple virtual networks, such as source virtual machine 184's virtual network and the destination virtual machine's virtual network (see FIG. 7 and corresponding text for further details). Hardware accelerated bridge processing ends at 480.

Figure 5:
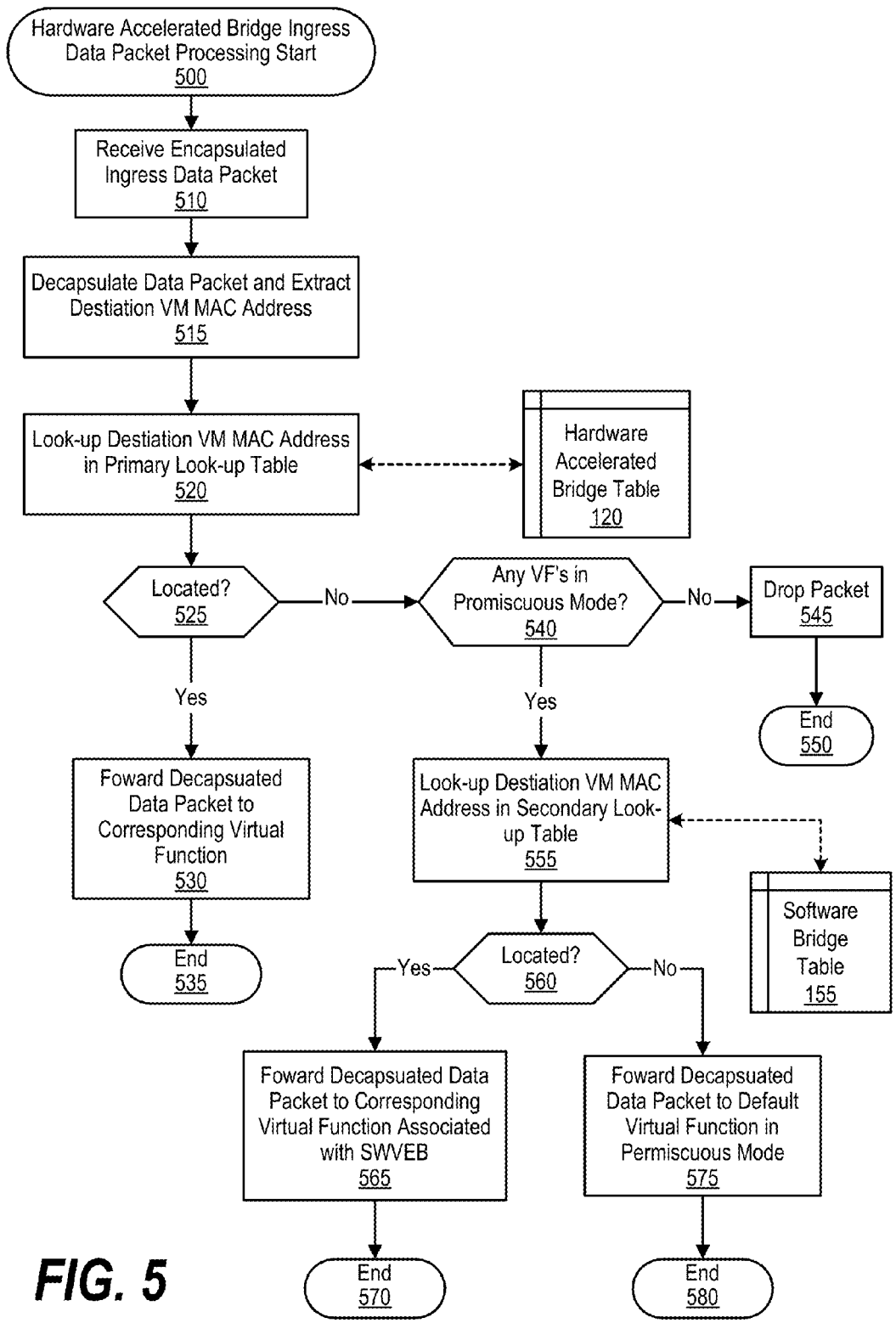
FIG. 5 is a flowchart showing steps taken in a hardware accelerated bridge processing an ingress data packet.

FIG. 5 is a flowchart showing steps taken in a hardware accelerated bridge processing an ingress data packet. Processing commences at 500, whereupon the hardware accelerated bridge receives an encapsulated ingress data packet at step 510. At step 515, the hardware accelerated bridge decapsulates the data packet and extracts a MAC address corresponding to the destination virtual machine at step 515 (destination MAC address). In one embodiment, the hardware accelerated bridge extracts a destination overlay network ID and a destination virtual machine IP address included in an overlay header to verify that the data packet is received from a virtual domain at the correct destination host (see FIG. 6 and corresponding text for further details).

Next, the hardware accelerated bridge looks up the destination MAC address in hardware accelerated bridge table 120 in an attempt to identify a corresponding "direct path" virtual function to send the data packet (step 520). As discussed herein, hardware accelerated bridge table 120 includes table entries corresponding to virtual machines directly associated with a particular virtual function (see FIGS. 1-2 and corresponding text for further details). In one embodiment, a system may include a single table that includes both hardware accelerated bridge table entries and software bridge table entries.

A determination is made as to whether the hardware accelerated bridge located a corresponding hardware accelerated bridge table entry (decision 525). If the hardware accelerated bridge locates an entry, indicating that the destination virtual machine is a direct path virtual machine, decision 525 branches to the "Yes" branch, whereupon the hardware accelerated bridge forwards the decapsulated data packet to the corresponding virtual function that corresponds to the identified hardware accelerated bridge table entry in step 520. Processing ends at 535.

On the other hand, if the hardware accelerated bridge did not locate a table entry in hardware accelerated bridge 120, decision 525 branches to the "No" branch, whereupon the hardware accelerated bridge determines whether one or more virtual functions are in a "promiscuous mode." As those skilled in the art can appreciate, virtual functions are placed in promiscuous mode in order to handle data packets that are not directly associated with a particular virtual function (e.g., data packets with a destination virtual machine that are not included in hardware accelerated bridge table 120). If there are not any virtual functions in promiscuous mode, decision 540 branches to the "No" branch, whereupon the hardware accelerated bridge drops the data packet (step 545) and processing ends at 550.

On the other hand, if there are one or more virtual functions in promiscuous mode, decision 540 branches to the "Yes" branch, whereupon the hardware accelerated bridge accesses software bridge table 155 to identify a software bridge table entry that corresponds to the destination MAC address (step 555). In one embodiment, software bridge table 155 is populated by a VIOS that manages software bridges that execute on, for example, a hypervisor.

A determination is made as to whether the hardware accelerated bridge identified a corresponding table entry in software bridge 155 (decision 560). If so, decision 560 branches to the "Yes" branch, thus indicating that the destination virtual machine is a software bridged virtual machine assigned to a particular software bridge. At step 565, the hardware accelerated bridge forwards the decapsulated data packet to the software bridge through its virtual function that corresponds to the identified software bridge table entry (step 565). Processing ends at 570. The software bridge, in turn, forwards the decapsulated data packet to the appropriate destination virtual machine.

Referring back to decision 560, if the hardware accelerated bridge does not locate a corresponding table entry in software bridge table 155, decision 560 branches to the "No" branch, whereupon the hardware accelerated bridge forwards the data packet to a virtual function that is operating in promiscuous mode (step 575). Processing ends at 580.

Figure 6:
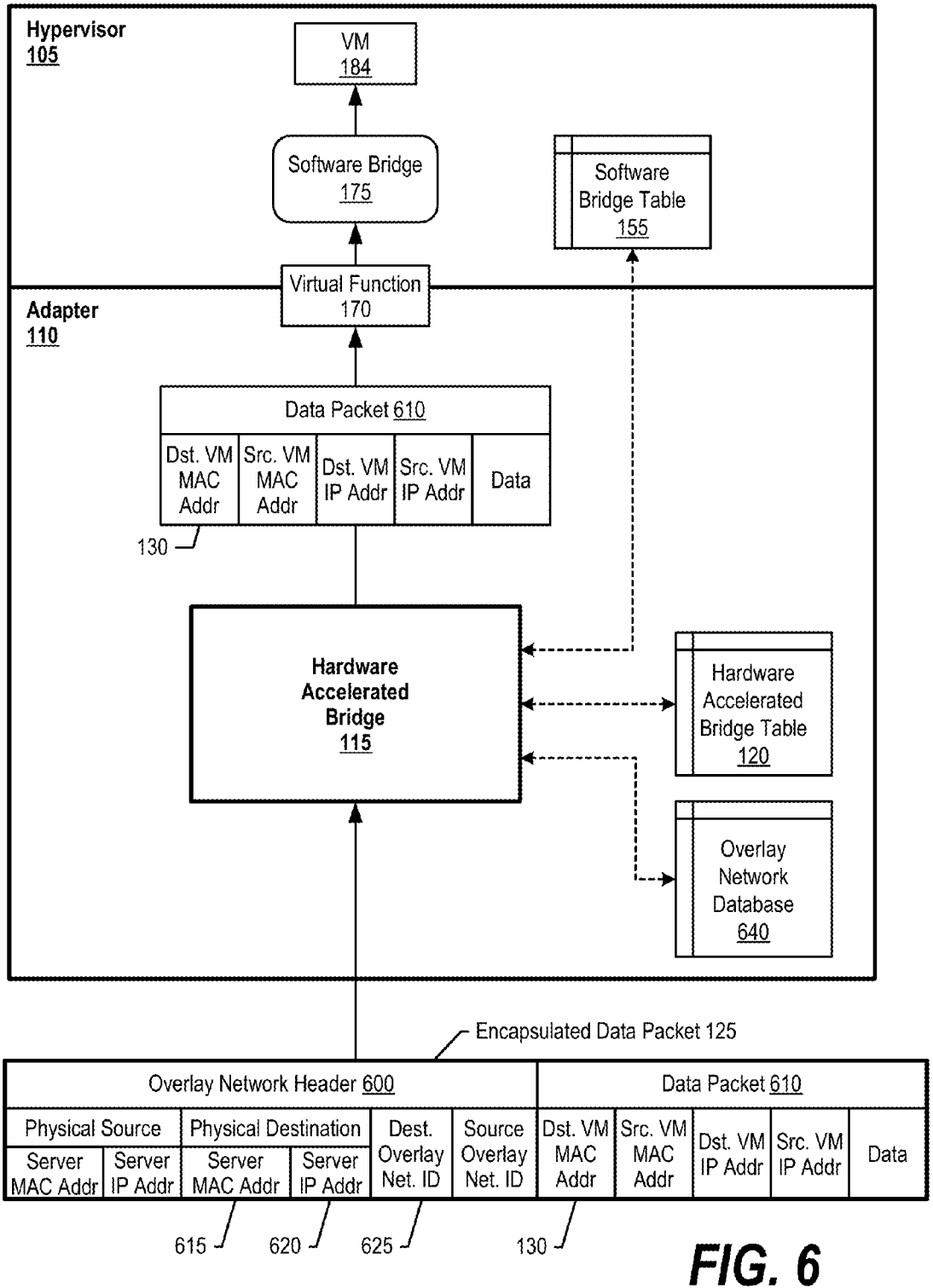
FIG. 6 is a diagram showing a hardware accelerated bridge processing an encapsulated data packet that is received over a virtual domain with a destination at a software bridged virtual machine.

FIG. 6 is a diagram showing a hardware accelerated bridge processing an encapsulated data packet that is received over a virtual domain with a destination at a software bridged virtual machine.

Hardware accelerated bridge 115 executes on adapter 110 and receives encapsulated data packet 125, which includes overlay network header 600 and data packet 610. Hardware accelerated bridge 115 extracts a destination overlay network identifier from field 625, as well as the destination physical host's MAC/IP address from fields 615 and 620, respectively. In turn, hardware accelerated bridge 115 uses overlay network database 640 to verify encapsulated data packet 125 is destined for host 100. Overlay network database 640 includes table entries corresponding to virtual network abstractions overlayed on a physical network. The table entries associate virtual machines to particular virtual domains and host systems. (see FIG. 7 and corresponding text for further details).

Hardware accelerated bridge 115 decapsulates encapsulated data packet 125 and utilizes destination MAC address 130 in conjunction with software bridge table 155 and hardware accelerated bridge tale 120 as discussed herein to determine which virtual function to forward data packet 610 (see FIGS. 1-2 and corresponding text for further details). In turn, virtual function 170 passes data packet 610 to software bridge 175, which provides data packet 610 to the appropriate software bridged virtual machine 184.

Figure 7:
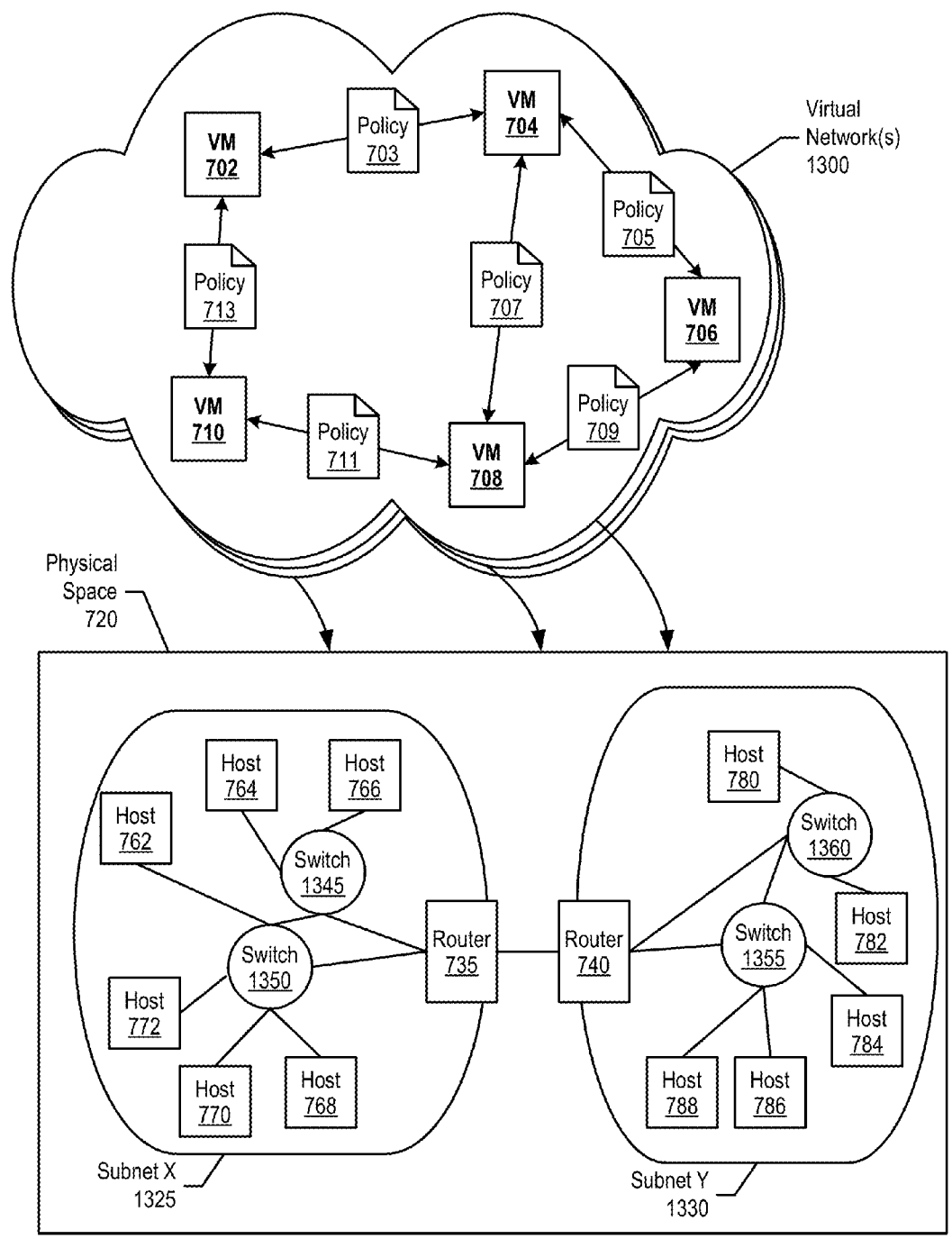
FIG. 7 is a diagram showing virtual network abstractions that are overlayed onto a physical network space.

FIG. 7 is a diagram showing virtual network abstractions that are overlayed onto a physical network space. Virtual networks 700 include policies (e.g., policies 703-713) that provide an end-to-end virtual connectivity between virtual machines (e.g., virtual machines 702-710). Each of virtual networks 100 corresponds to a unique virtual identifier, which allows concurrent operation of multiple virtual networks over physical space 720. As those skilled in the art can appreciate, some of virtual networks 700 may include a portion of virtual machines 702-710, while other virtual networks 700 may include different virtual machines and different policies than what is shown in FIG. 7.

When a "source" virtual machine sends data to a "destination" virtual machine, a policy corresponding to the two virtual machines describes a logical path on which the data travels (e.g., through a firewall, through an accelerator, etc.). In other words, policies 703-713 define how different virtual machines communicate with each other (or with external networks). For example, a policy may define quality of service (QoS) requirements between a set of virtual machines; access controls associated with particular virtual machines; or a set of virtual or physical appliances (equipment) to traverse when sending or receiving data. In addition, some appliances may include accelerators such as compression, IP Security (IPSec), SSL, or security appliances such as a firewall or an intrusion detection system. In addition, a policy may be configured to disallow communication between the source virtual machine and the destination virtual machine.

Virtual networks 700 are logically overlayed onto physical space 720, which includes physical entities 735 through 788 (hosts, switches, and routers). While the way in which a policy is enforced in the system affects and depends on physical space 720, virtual networks 700 are more dependent upon logical descriptions in the policies. As such, multiple virtual networks 700 may be overlayed onto physical space 720. As can be seen, physical space 720 is divided into subnet X 725 and subnet Y 730. The subnets are joined via routers 735 and 740. Virtual networks 700 are independent of physical constraints of physical space 720 (e.g., L2 layer constraints within a subnet). Therefore, a virtual network may include physical entities included in both subnet X 725 and subnet Y 730.

In one embodiment, the virtual network abstractions support address independence between different virtual networks 700. For example, two different virtual machines operating in two different virtual networks may have the same IP address. As another example, the virtual network abstractions support deploying virtual machines, which belong to the same virtual networks, onto different hosts that are located in different physical subnets (includes switches and/or routers between the physical entities). In another embodiment, virtual machines belonging to different virtual networks may be hosted on the same physical host. In yet another embodiment, the virtual network abstractions support virtual machine migration anywhere in a data center without changing the virtual machine's network address and losing its network connection.

Figure 8:
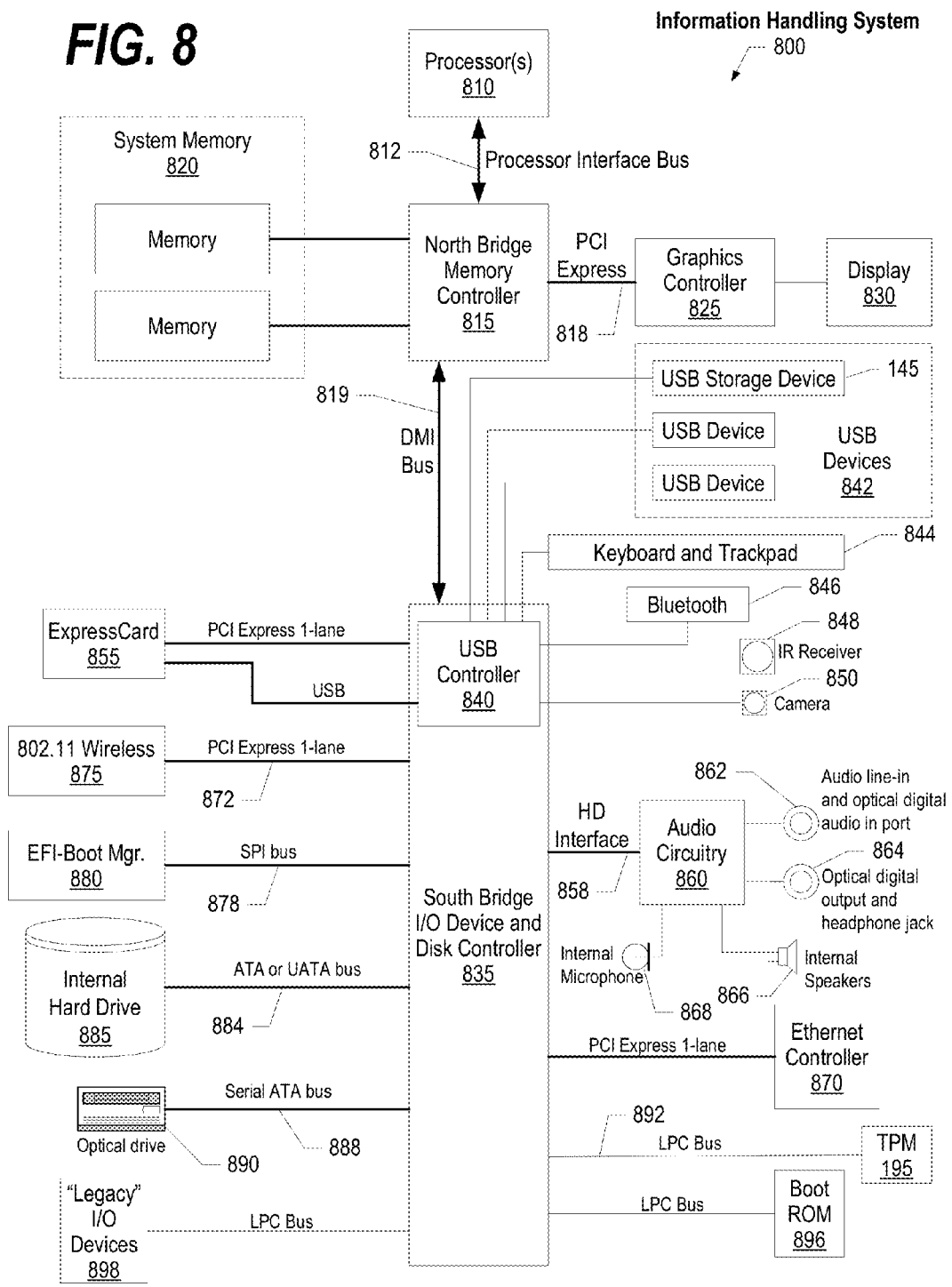
FIG. 8 is a block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
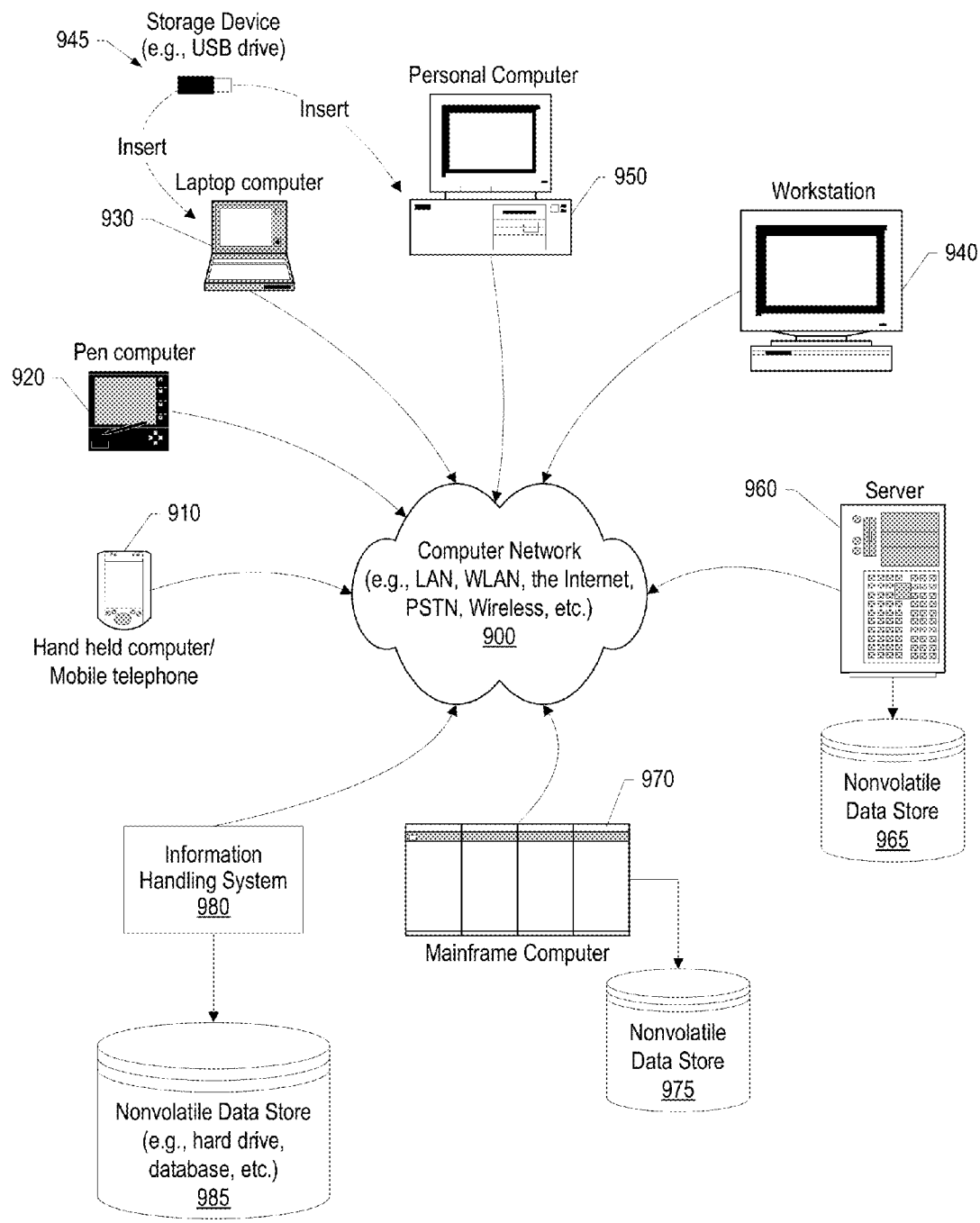
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
receiving an ingress data packet at a hardware accelerated bridge executing on a network adapter, the ingress data packet including a destination MAC address that corresponds to a virtual machine that interfaces with a software bridge executing on a hypervisor;
identifying, by the hardware accelerated bridge, a software bridge table entry that includes the destination MAC address and a virtual function identifier that identifies a virtual function that corresponds to the software bridge; and
sending the data packet from the hardware accelerated bridge to the software bridge using the identified virtual function.

2. The method of claim 1 wherein the destination MAC address is different than a virtual function MAC address of the virtual function.

3. The method of claim 1 further comprising:
accessing a hardware accelerated bridge table, wherein the hardware accelerated bridge table includes one or more hardware accelerated bridge table entries, each of the one or more hardware accelerated bridge table entries corresponding to a direct path virtual machine and a direct path virtual function that have a matching MAC address;
determining that the destination MAC address fails to be included in one of the hardware accelerated bridge table entries;
identifying the software bridge table entry from one or more software bridge table entries included in a software bridge table, wherein each of the one or more software bridge table entries corresponding to a software bridged virtual machine and a software bridge virtual function identifier;
extracting the software bridge virtual function identifier from the identified software bridge table entry; and
selecting the virtual function based upon the extracted virtual function identifier.

4. The method of claim 1 wherein a plurality of virtual functions are in promiscuous mode, the virtual function included in the plurality of virtual functions.

5. The method of claim 1 further comprising:
receiving, at the hypervisor, a request to add a new virtual machine;
instantiating the new virtual machine, the instantiating including assigning a new MAC address to the new virtual machine;
determining that the new virtual machine is assigned to the software bridge; and
sending a notification to a virtual I/O server that informs the virtual I/O server of the new virtual machine, wherein the software virtual I/O server executes a plurality of software bridges, the software bridge included in the plurality of software bridges.

6. The method of claim 5 further comprising:
receiving the notification at the virtual I/O server;
selecting, by the virtual I/O server, the software bridge from the plurality of software bridges;
assigning the new virtual machine to the software bridge; and
adding a new software bridge table entry to a software bridge table that corresponds to the software bridge, wherein the new software bridge table entry includes the new MAC address and a software bridge virtual function identifier that identifies the virtual function corresponding to the software bridge.

7. The method of claim 1 wherein the ingress data packet is encapsulated with an overlay network header, the method further comprising:
extracting a physical host address and a destination overlay network identifier from the overlay network header, the destination overlay header identifying one of a plurality of virtual domains that are each independent of physical topology constraints of a physical network; and
determining, based upon the extracted physical host address and the destination overlay network adapter, that the ingress data packet corresponds to the network adapter.

8. The method of claim 7 wherein each of the plurality of virtual domains corresponds to an independent virtual address space and is independently managed by one of a plurality of heterogeneous tenants.

9. An information handling system comprising:
one or more processors;
a memory coupled to at least one of the processors;
a set of computer program instructions stored in the memory and executed by at least one of the processors in order to perform actions of:
receiving an ingress data packet at a hardware accelerated bridge executing on a network adapter, the ingress data packet including a destination MAC address that corresponds to a virtual machine that interfaces with a software bridge executing on a hypervisor;
identifying, by the hardware accelerated bridge, a software bridge table entry that includes the destination MAC address and a virtual function identifier that identifies a virtual function that corresponds to the software bridge; and
sending the data packet from the hardware accelerated bridge to the software bridge using the identified virtual function.

10. The information handling system of claim 9 wherein the virtual machine is a software bridged virtual machine, and wherein the destination MAC address is different than a virtual function MAC address of the virtual function.

11. The information handling system of claim 9 wherein the processors perform additional actions comprising:
accessing a hardware accelerated bridge table, wherein the hardware accelerated bridge table includes one or more hardware accelerated bridge table entries, each of the one or more hardware accelerated bridge table entries corresponding to a direct path virtual machine and a direct path virtual function that have a matching MAC address;
determining that the destination MAC address fails to be included in one of the hardware accelerated bridge table entries;
identifying the software bridge table entry from one or more software bridge table entries included in a software bridge table, wherein each of the one or more software bridge table entries corresponding to a software bridged virtual machine and a software bridge virtual function identifier;
extracting the software bridge virtual function identifier from the identified software bridge table entry; and
selecting the virtual function based upon the extracted virtual function identifier.

12. The information handling system of claim 9 wherein a plurality of virtual functions are in promiscuous mode, the virtual function included in the plurality of virtual functions.

13. The information handling system of claim 9 wherein the processors perform additional actions comprising:
receiving, at the hypervisor, a request to add a new virtual machine;
instantiating the new virtual machine, the instantiating including assigning a new MAC address to the new virtual machine;
determining that the new virtual machine is assigned to the software bridge; and
sending a notification to a virtual I/O server that informs the virtual I/O server of the new virtual machine, wherein the software virtual I/O server executes a plurality of software bridges, the software bridge included in the plurality of software bridges.

14. The information handling system of claim 13 wherein the processors perform additional actions comprising:
receiving the notification at the virtual I/O server;
selecting, by the virtual I/O server, the software bridge from the plurality of software bridges;
assigning the new virtual machine to the software bridge; and
adding a new software bridge table entry to a software bridge table that corresponds to the software bridge, wherein the new software bridge table entry includes the new MAC address and a software bridge virtual function identifier that identifies the virtual function corresponding to the software bridge.

15. The information handling system of claim 9 wherein the ingress data packet is encapsulated with an overlay network header, the processors performing additional actions comprising:
extracting a physical host address and a destination overlay network identifier from the overlay network header, the destination overlay header identifying one of a plurality of virtual domains that are each independent of physical topology constraints of a physical network; and
determining, based upon the extracted physical host address and the destination overlay network adapter, that the ingress data packet corresponds to the network adapter.

16. The information handling system of claim 15 wherein each of the plurality of virtual domains corresponds to an independent virtual address space and is independently managed by one of a plurality of heterogeneous tenants.

17. A computer program product stored in a computer readable storage device, comprising computer program code that, when executed by an information handling system, causes the information handling system to perform actions comprising:
receiving an ingress data packet at a hardware accelerated bridge executing on a network adapter, the ingress data packet including a destination MAC address that corresponds to a virtual machine that interfaces with a software bridge executing on a hypervisor;

identifying, by the hardware accelerated bridge, a software bridge table entry that includes the destination MAC address and a virtual function identifier that identifies a virtual function that corresponds to the software bridge; and sending the data packet from the hardware accelerated bridge to the software bridge using the identified virtual function.

18. The computer program product of claim 17 wherein the virtual machine is a software bridged virtual machine, and wherein the destination MAC address is different than a virtual function MAC address of the virtual function.

19. The computer program product of claim 17 wherein the information handling system performs further actions comprising:

accessing a hardware accelerated bridge table, wherein the hardware accelerated bridge table includes one or more hardware accelerated bridge table entries, each of the one or more hardware accelerated bridge table entries corresponding to a direct path virtual machine and a direct path virtual function that have a matching MAC address;

determining that the destination MAC address fails to be included in one of the hardware accelerated bridge table entries;

identifying the software bridge table entry from one or more software bridge table entries included in a software bridge table, wherein each of the one or more software bridge table entries corresponding to a software bridged virtual machine and a software bridge virtual function identifier;

extracting the software bridge virtual function identifier from the identified software bridge table entry; and selecting the virtual function based upon the extracted virtual function identifier.

20. The computer program product of claim 17 wherein a plurality of virtual functions are in promiscuous mode, the virtual function included in the plurality of virtual functions.

21. The computer program product of claim 17 wherein the information handling system performs further actions comprising:

receiving, at the hypervisor, a request to add a new virtual machine;

instantiating the new virtual machine, the instantiating including assigning a new MAC address to the new virtual machine;

determining that the new virtual machine is assigned to the software bridge; and sending a notification to a virtual I/O server that informs the virtual I/O server of the new virtual machine, wherein the software virtual I/O server executes a plurality of software bridges, the software bridge included in the plurality of software bridges.

22. The computer program product of claim 21 wherein the information handling system performs further actions comprising:

receiving the notification at the virtual I/O server;

selecting, by the virtual I/O server, the software bridge from the plurality of software bridges;

assigning the new virtual machine to the software bridge; and adding a new software bridge table entry to a software bridge table that corresponds to the software bridge, wherein the new software bridge table entry includes the new MAC address and a software bridge virtual function identifier that identifies the virtual function corresponding to the software bridge.

23. The computer program product of claim 17 wherein the ingress data packet is encapsulated with an overlay network header, the information handling system performing further actions comprising:

extracting a physical host address and a destination overlay network identifier from the overlay network header, the destination overlay header identifying one of a plurality of virtual domains that are each independent of physical topology constraints of a physical network; and determining, based upon the extracted physical host address and the destination overlay network adapter, that the ingress data packet corresponds to the network adapter.

24. The computer program product of claim 23 wherein each of the plurality of virtual domains corresponds to an independent virtual address space and is independently managed by one of a plurality of heterogeneous tenants.

25. A method comprising:

receiving an ingress data packet at a hardware accelerated bridge executing on a network adapter, the ingress data packet including a destination MAC address that corresponds to a virtual machine that interfaces with a software bridge executing on a hypervisor;

accessing a hardware accelerated bridge table that includes one or more hardware accelerated bridge table entries, each of the one or more hardware accelerated bridge table entries corresponding to a direct path virtual machine and a direct path virtual function that have a matching MAC address;

determining that the destination MAC address fails to be included in one of the hardware accelerated bridge table entries;

accessing a software bridge table in response to determining that the destination MAC address fails to be include in one of the hardware accelerated bridge table entries;

identifying a software bridge table entry included in the software bridge table that includes the destination MAC address and a virtual function identifier that identifies a virtual function corresponding to the software bridge, wherein the destination MAC address is different than a virtual function MAC address of the virtual function; and sending the data packet from the hardware accelerated bridge to the software bridge using the identified virtual function.

* * * * *